Nov. 18, 1930.                E. FRIIS-HANSEN                1,782,261
                              HARVESTING MACHINE
                        Filed Sept. 5, 1928       2 Sheets-Sheet 1
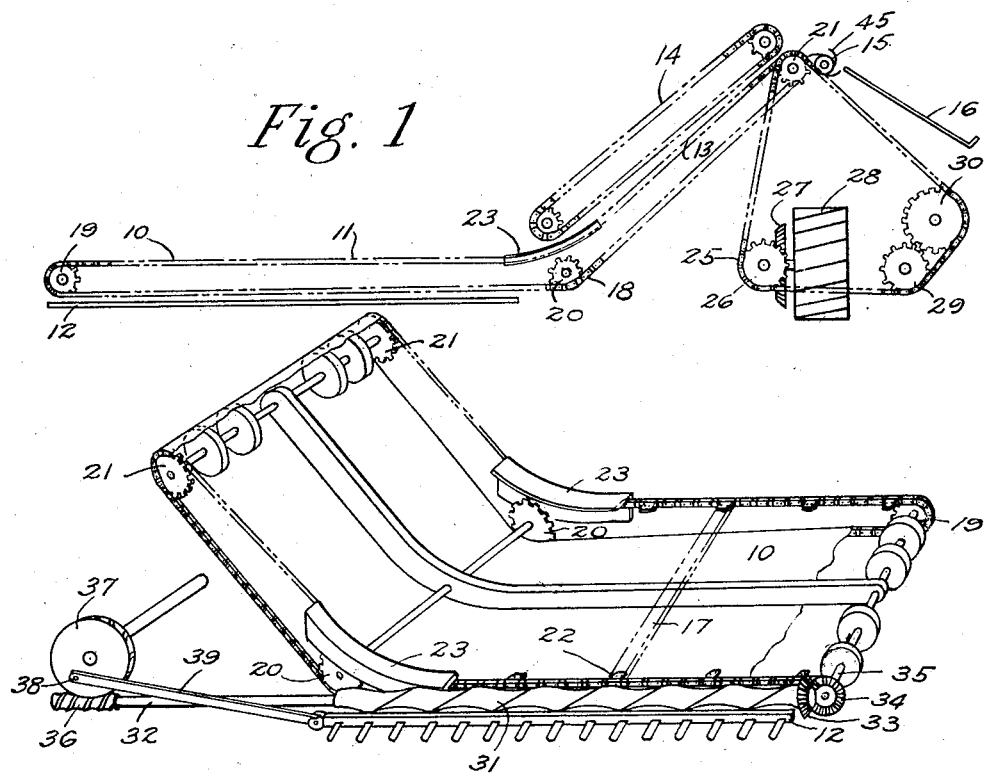
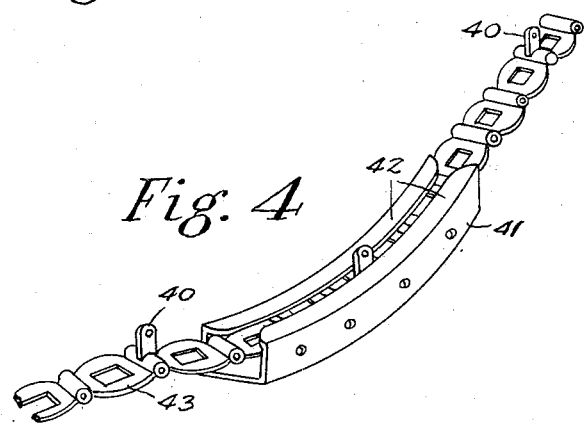
INVENTOR.
ERIK FRIIS-HANSEN
BY Marks & Clerk
ATTORNEYS.

Nov. 18, 1930.   E. FRIIS-HANSEN   1,782,261
HARVESTING MACHINE
Filed Sept. 5, 1928   2 Sheets-Sheet 2
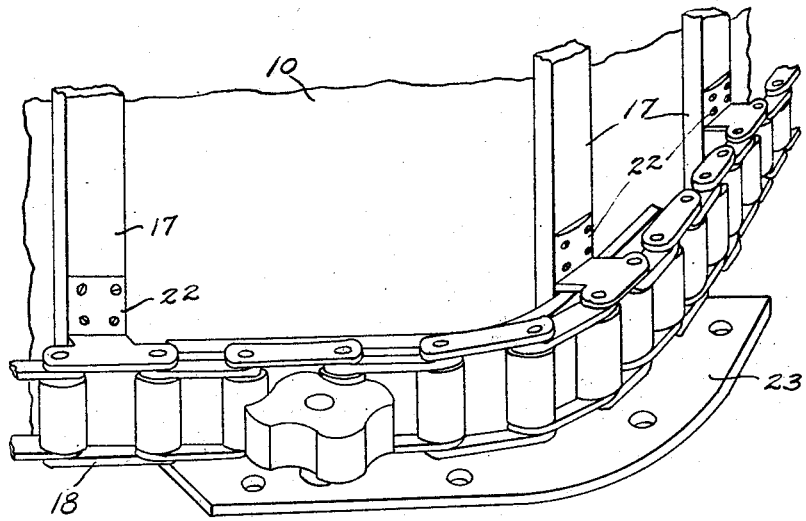
Fig. 3
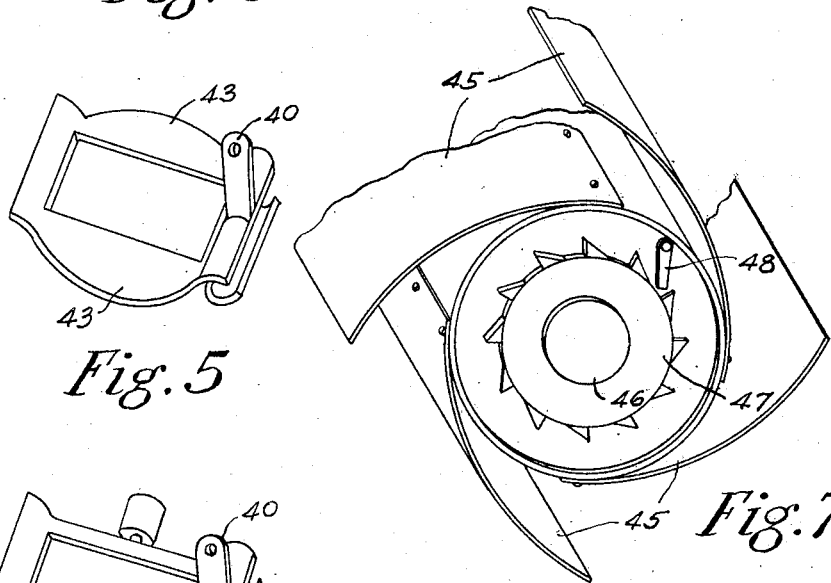
Fig. 5
Fig. 7
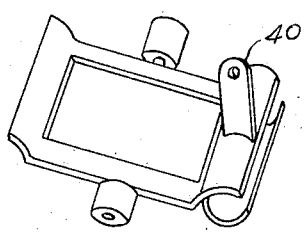
Fig. 6
INVENTOR.
ERIK FRIIS-HANSEN
BY Marks & Clerk
ATTORNEYS.

Patented Nov. 18, 1930

1,782,261

UNITED STATES PATENT OFFICE

ERIK FRIIS-HANSEN, OF FORT SASKATCHEWAN, ALBERTA, CANADA

HARVESTING MACHINE

Application filed September 5, 1928. Serial No. 303,987.

The present invention relates generally to harvesting machines and more particularly to the elevating conveyor for carrying the cut grain to the binder mechanism. At the present time considerable difficulty is experienced with the canvas belts employed for elevators, the belts being subject to stretching when moistened and when dried after being wet the belts often shrink to a degree that they become extremely tight. In either case the belt forms such contact with the driving rolls that it either slips or binds and decreases the efficiency of the machine.

It is also known that the roller which usually bridges the gap between the elevator and the inclined grain deck adjacent the binder will become covered with grass and weeds which are carried along with the butt ends of the grain stalks. This causes bunching of short lengths of grass or other vegetation on the bridging roller and acts to brake the roller.

It is an object of the present invention to provide a combined platform and elevator belt with means for positively driving the belt, the preferred driving means comprising a link chain with which the belt is designed to cooperate and sprockets for actuating the chain. It is a further object of the invention to guide the belt in its movement from a horizontal position to an inclined position. It is still another object to provide a self-cleaning bridging roller which will prevent accumulation of short lengths of grass and other vegetation on the roller. Further objects of the invention will be apparent from the following description taken in connection with the accompanying drawings in which:

Fig. 1 is a diagrammatic illustration of a preferred form of the invention showing one means of driving the several parts of the mechanism;

Fig. 2 is a perspective view, showing the elevator frame and auger roller, the belt being removed;

Fig. 3 is a perspective view of the under part of the chain drive and belt guide;

Fig. 4 shows a modified form of the invention in perspective;

Figs. 5 and 6 illustrate two forms of links employed in the modified chain shown in Fig. 4; and, Fig. 7 is a perspective view of a portion of the bridging roller.

Referring to the drawings it will be seen that the elevating mechanism comprises an endless belt 10, a portion 11 of which moves horizontally and parallel to the cutting bar 12 and the remainder 13 moves in an inclined direction and parallel to an auxiliary belt 14. The cut grain is carried by and between the belts 10 and 14 over roller 15 to a grain deck 16 with which is associated a binding mechanism, (not shown), of any suitable type. In most types of elevators the elevator and platform belts are separate and moved by driving rollers but, by a suitable arrangement described hereinafter it is possible to employ a single endless belt to perform the functions of transferring the cut grain from the cutter to the elevator and raise the grain to the binder.

In the present invention the belt consists of the usual canvas band provided with transverse bars 17. Cooperating with the belt along each edge thereof is an endless chain 18 designed to be driven and guided by sprockets 19, 20 and 21. At spaced intervals along the chain, cleats or brackets 22, forming part of the links or fastened to the links in some suitable manner, are secured to the transverse bars forming part of the elevator belt. At the intersection of the two planes in which the belt travels the belt is guided or constrained to move in a definite path by means of guide rails 23 which, as illustrated in Fig. 3, comprise angle bars bent to conform with the desired path of the belt. The cleats are so formed that they ride along the horizontal web of the guide rail and at the same time space the belt from the links, the chain passing beneath the rail while the belt passes over it. This tends to free the under side of the belt of foreign material and keep the chain clear. This arrangement also prevents accumulation of grain and grass at this intersection, an inconvenience which is generally present when the belt is formed in two parts and a gap present between the ends of the belt. The chain is provided with suitable rollers 24 to permit the chain to ride on the under side of the rail with as little friction as possible, these rollers further cooperating with the sprockets 19, 20 and 21 to drive the conveyor belt.

In the diagrammatic illustration (Fig. 1) the sprocket 21 is provided with an auxiliary set of teeth coacting with a drive chain 25. The chain 25 is driven by suitable bevel gears 26, 27, the latter being connected with the bull wheel 28 of the reaper. The chain 25 may also drive other gears, such as those shown at 29 and 30, forming part of the cutting and binding mechanism.

In Fig. 2 is shown in detail a preferred means of actuating the cutter bar, and an auger roller or screw for pushing the cut grain on to the conveyor belt. The auger roller 31 and its shaft 32 are driven by bevel gears 33, 34, one of which is keyed to shaft 35 to which is also fixed the sprocket 19. The end of shaft 32 is provided with a worm 36 which drives a worm wheel 37, the latter having a pin 38 thereon for reciprocating the connecting rod 39 secured to the cutter bar 12. The purpose of the auger bar is to force the grain stalks toward the belt, thus insuring the proper disposition of the grain on the conveyor.

The belt is preferably driven by the shaft 35 in order that the tight side of the belt may be underneath, thus permitting the chain 18 to pass under the guide rails with a minimum amount of friction. It is obvious, however, that the belt may be driven by any of the sprockets.

In the form of the invention illustrated in Figs. 3, 4 and 5, some of the chain links are provided with ears or projections 40 designed to pass through reinforced eyelets in the canvas belt or in the transverse bars 17. Each ear is drilled near its upper end to accommodate a cotter pin or other suitable means for securing the links to the belt. The guide rail for this form of link consists of a channel member 41 having inwardly turned flanges 42 on its upper side, the flanges serving as rails over which the links slide or roll and being spaced to provide a slot through which the pins may pass. This type of guide rail permits the belt to ride over the flanges while the chain passes under the flanges.

The links may be made relatively wide to provide wings 43 adapted to form a bearing surface for the chain as it passes through the guide rail, as shown in Fig. 5, or they may have rollers 44, as shown in Fig. 6, to lessen friction as the chain contacts the rail.

In the type of harvester generally employing an elevator and binder platform it is common practice to bridge the gap between the end of the elevator belt and the grain deck or platform by interposing a roller over which the grain rides to the grain deck. Since there is grass and other vegetation growing around the butt ends of the grain stalks much of this grass and short length vegetation is cut with the grain. Much difficulty has been experienced with these grasses due to the fact that they separate from the grain and wrap around exposed parts such as rollers. As shown in Fig. 7, the present invention obviates this inconvenience by providing the bridging roller with a number of longitudinal metallic flaps 45 designed to permit the grain to be carried over to the grain deck but so arranged that they prevent accumulation of loose matter and grasses. The roller shaft 46 is preferably driven by an auxiliary sprocket, the roller being loosely mounted on the shaft. A ratchet clutch 47 is secured to the shaft, engaging a pawl 48 on the roller when rotating in one direction but disengaging the pawl when rotated in the opposite direction. Due to the form of flap employed it is obvious that the roller should be rotated only in one direction and it is necessary to employ a uni-directional clutch connection between the roller and its driving shaft.

From the above description it will be seen that this invention obviates many of the difficulties present in harvesting machines. Since it is necessary to adjust the present type of belt in accordance with atmospheric conditions, much time is wasted in tightening or loosening straps, freeing rollers of foreign matter which becomes hard and tightly wrapped on the rollers, and removing grass from the cutters. In the present arrangement the belt is positively driven regardless of the stretch or shrinkage thereof and, being in one length, eliminates the gap between the platform and the elevator. The bridging roller is self-cleaning and insures free operation of this element by obviating the braking effect of grasses which usually cling to rollers disposed in gaps.

Although a preferred form of the invention has been illustrated and described, it is obvious that it may be modified to meet certain requirements and is not limited to the exact arrangement shown in the drawings.

What I claim is:

1. In a harvesting machine, a frame including side members, each of which consists of two legs disposed angularly with respect to each other, a transverse shaft at each end of the frame, a third transverse shaft mounted in the frame at the point of juncture of the legs, a curved guide rail on the inner side of each side member at the point of juncture of the legs, a sprocket wheel at each end of said shafts, an endless chain at each side of said frame, each of the chains comprising a plurality of links some of which have projections thereon, said chains operating over said sprocket wheels and being guided by said guide rails, and an endless conveyor belt secured to the projections on the links of the chains and adapted to travel in a path conforming to the shape of the frame.

2. In a harvesting machine, a cutter bar, an endless belt conveyor, a portion of said conveyor being parallel to said cutter bar, and a screw interposed between said cutter bar and said conveyor, the axis of said screw being parallel to said cutter bar.

3. In a harvesting machine as claimed in claim 2, a drive shaft for said conveyor, and means on said shaft for driving said cutter bar and screw.

4. In a harvesting machine, an elevator belt, a grain deck, the upper ends of said belt and said deck being adjacent but spaced from each other, a bridging roller interposed between said upper ends, and means on said roller to prevent accumulation of vegetation thereon.

5. In a harvesting machine, an elevator belt, a grain deck, the upper ends of said belt and said deck being adjacent but spaced from each other, a bridging roller interposed between said upper ends, and a plurality of longitudinally disposed flaps secured to said roller.

6. In a harvesting machine, an elevator belt, a grain deck, the upper ends of said belt and said deck being adjacent but spaced from each other, a bridging roller interposed between said upper ends, a shaft for driving said roller, and a uni-directional clutch adapted to rotate said roller when the shaft is rotated in one direction and permit relative movement when the shaft is rotated in the opposite direction.

In testimony whereof I affix my signature.

ERIK FRIIS-HANSEN.